US007547861B2

(12) United States Patent
Jorgensen

(10) Patent No.: US 7,547,861 B2
(45) Date of Patent: Jun. 16, 2009

(54) VORTEX GENERATOR FOR PLASMA TREATMENT

(76) Inventor: Morten Jorgensen, 4676 S. Shore Ave., Slinger, WI (US) 53086

( * ) Notice: Subject to any disclaimer, the term of this patent is extended or adjusted under 35 U.S.C. 154(b) by 272 days.

(21) Appl. No.: 11/450,887

(22) Filed: Jun. 9, 2006

(65) Prior Publication Data

US 2007/0284340 A1 Dec. 13, 2007

(51) Int. Cl.
*B23K 9/00* (2006.01)
*B23K 9/02* (2006.01)

(52) U.S. Cl. .............................. 219/121.5; 219/121.36; 219/121.56; 219/121.11; 164/46

(58) Field of Classification Search .............. 219/151.5, 219/121.48, 121.36, 121.51, 121.52, 121.59, 219/121.49, 121.45, 121.37, 75; 315/111.21; 164/46; 373/18; 427/488, 250, 255.18; 118/723 E, 118/723 RE, 723 R
See application file for complete search history.

(56) References Cited

U.S. PATENT DOCUMENTS

| | | | | |
|---|---|---|---|---|
| 1,638,336 | A * | 8/1927 | Himes | 219/121.11 |
| 2,892,067 | A | 6/1959 | Donald et al. | |
| 2,944,140 | A | 7/1960 | Giannine et al. | |
| 3,515,839 | A | 6/1970 | Gejo et al. | |
| 3,579,027 | A | 5/1971 | Pater | |
| 3,707,615 | A | 12/1972 | Rotolico et al. | |
| 3,803,380 | A | 4/1974 | Ragaller | |
| 3,849,584 | A | 11/1974 | Paton et al. | |
| 3,865,173 | A * | 2/1975 | Rohrberg | 164/46 |
| 3,914,573 | A | 10/1975 | Muehlberger | |
| 4,185,213 | A | 1/1980 | Scannell | |
| 4,495,399 | A | 1/1985 | Cann | |
| 4,877,937 | A | 10/1989 | Müller | |
| 4,896,016 | A | 1/1990 | Broberg et al. | |
| 4,912,296 | A | 3/1990 | Schlienger | |
| 4,969,432 | A | 11/1990 | Scharnweber et al. | |
| 5,043,554 | A | 8/1991 | Kohsaka et al. | |
| 5,147,998 | A * | 9/1992 | Tsantrizos et al. | 219/121.5 |
| 5,208,442 | A | 5/1993 | Ahola et al. | |
| 5,278,387 | A | 1/1994 | Borne | |
| 5,317,126 | A | 5/1994 | Couch, Jr. et al. | |
| 5,328,516 | A | 7/1994 | Dietiker | |
| 5,451,739 | A * | 9/1995 | Nemchinsky et al. | 219/121.51 |
| 5,539,176 | A | 7/1996 | Ikegaya et al. | |
| 5,548,611 | A | 8/1996 | Cusick et al. | |
| 5,837,958 | A | 11/1998 | Förnsel et al. | |
| 6,121,572 | A | 9/2000 | Holste et al. | |
| 6,262,386 | B1 | 7/2001 | Förnsel et al. | |
| 6,265,690 | B1 | 7/2001 | Förnsel et al. | |
| 6,355,312 | B1 | 3/2002 | Förnsel et al. | |
| 6,659,110 | B2 | 12/2003 | Förnsel et al. | |

(Continued)

FOREIGN PATENT DOCUMENTS

| | | |
|---|---|---|
| DE | 685 455 | 12/1939 |

(Continued)

*Primary Examiner*—Quang T Van
(74) *Attorney, Agent, or Firm*—Foley & Lardner LLP

(57) ABSTRACT

A vortex generator uses a single piece to generate the vortex and hold the electrode. The single piece may be a non-conductive material such as a ceramic. The vortex generator may use threads to hold the electrode. The threads and holes for generating the vortex may be bored into the base material of the vortex generator before the base material is hardened.

20 Claims, 7 Drawing Sheets

U.S. PATENT DOCUMENTS

| | | | |
|---|---|---|---|
| 6,677,550 | B2 | 1/2004 | Förnsel et al. |
| 6,800,336 | B1 | 10/2004 | Förnsel et al. |

FOREIGN PATENT DOCUMENTS

| | | |
|---|---|---|
| DE | 1 075 765 | 2/1960 |
| DE | 30 14 258 A 1 | 10/1981 |
| DE | 42 35 766 C1 | 5/1994 |
| DE | 43 25 939 C 1 | 10/1994 |
| DE | 298 05 999 U 1 | 6/1998 |
| FR | 1.181.788 | 6/1959 |
| WO | WO 93/13905 | 7/1993 |
| WO | WO 95/07152 | 3/1995 |

* cited by examiner

SECTION B–B

SECTION A–A

VORTEX GENERATOR FOR PLASMA TREATMENT

BACKGROUND

The present application relates generally to the field of plasma generators for treating a surface of an object with plasma.

Plasma generators have been used to treat surfaces of objects. These surfaces may be formed from materials such as plastics, rubber, glass, metals, and composites. Treating these surfaces may make it easier to bond things to the surfaces. For example, it may make it easier to apply paint, adhesives (e.g. to apply labels), coatings, laminates, and inks to the surfaces.

Plasma may be applied to surfaces for other reasons as well. Plasma may be applied to a surface to microclean a surface by removing organic and inorganic contaminants.

Plasma generators may include vortex generators that are configured to generate a vortex of working gas. In many plasma generators, the swirling gas caused by the vortex generator and an electrical arc interact to form the plasma.

Some prior vortex generators used a ceramic base material having holes at an angle to generate the vortex. These prior vortex generators included a threaded metal ring which was adhered to the ceramic base material. The metal ring was used to hold the electrode.

SUMMARY

Another embodiment is directed to a vortex generator for generating a vortex in and holding an electrode of a plasma generator. The vortex generator includes a base material. The vortex generator is configured to generate a vortex of working gas in the plasma generator. The base material is configured to directly hold the electrode.

Another embodiment is directed to a vortex generator for generating a vortex in and holding an electrode of a plasma generator. The vortex generator includes a base material that defines an attachment surface. The attachment surface is configured to attach to a surface of the electrode. The vortex generator is configured to generate a vortex of working gas in the plasma generator. The base material may be configured such that the electrode is releasably attached or may be configured such that the electrode is fixedly attached.

Another embodiment is directed to a vortex generator for generating a vortex in and holding an electrode of a plasma generator. The vortex generator comprises a non-conductive base material. Threads are integrally formed in the base material. A plurality of holes are also formed in the base material. The plurality of holes are configured to receive a working gas and to generate a vortex of working gas in the plasma generator. A second hole is also formed in the base material. The second hole can receive a conductor which may attach to the electrode to supply power to the electrode.

Another embodiment is directed to a vortex generator for generating a vortex in and holding an electrode of a plasma generator. The vortex generator comprises a base material defining threads. The vortex generator is configured to generate a vortex of working gas in the plasma generator using the base material.

Another embodiment is directed to a vortex generator for generating a vortex in and holding an electrode of a plasma generator. The vortex generator comprises threads integrally formed in a base material. The vortex generator is configured to generate a vortex of working gas in the plasma generator.

Another embodiment is directed to a plasma generator. The plasma generator comprises a working gas inlet for receiving a working gas, a chamber in which plasma is generated, an electrode configured to generate an electrical arc, and a vortex generator arranged such that at least some of the working gas passes from the working gas inlet through the vortex generator before passing through the chamber. The vortex generator includes a base material having a plurality of holes through which working gas can pass, the holes being arranged to generate a vortex in the chamber. The base material is configured to hold the electrode.

Another embodiment provides a plasma generator. The plasma generator comprises a means for generating an electrical arc, an inlet for a gas, and a means for generating a vortex of the gas and for holding an electrode in a one-piece frame. The generator is configured such that the gas and the electrical arc interact to form plasma.

Another embodiment is directed to a plasma generator. The plasma generator comprises a gas inlet for receiving a gas, an electrode configured to generate an electrical arc, a chamber in which plasma is generated from the interaction of the gas and the electrical arc; and a vortex generator arranged such that at least some of the gas passes from the gas inlet through the vortex generator before passing through the chamber. The vortex generator is configured to swirl the gas and maintain a position of the electrode using a common body.

Another embodiment is directed to a method for forming a vortex generator. The method comprises providing a body, forming a vortex system in the body, and connecting the electrode to the body. The method may also include forming a means to connect the electrode to the body in the body. The means formed in the body could include threads.

DETAILED DESCRIPTION OF EXEMPLARY EMBODIMENTS

Figure 6:
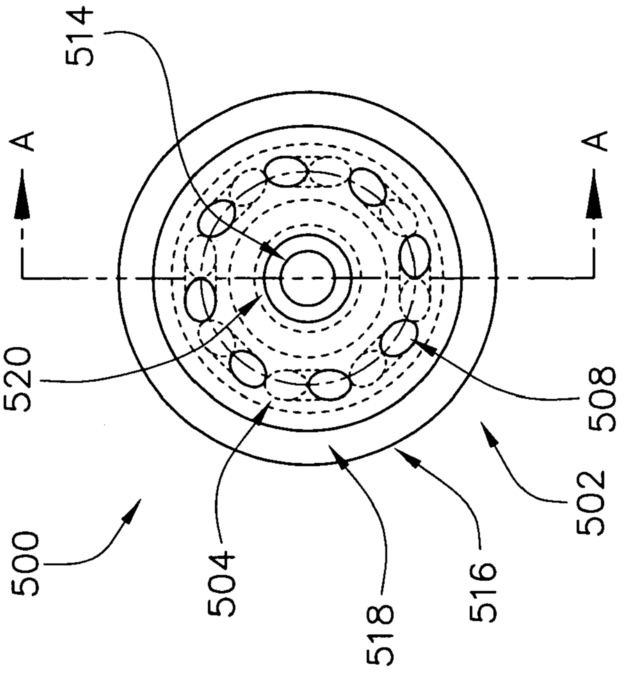
FIG. 6 is a bottom view of a vortex generator according to one embodiment which may be used in any plasma treatment apparatus including the apparatus of FIG. 1.
Figure 7:
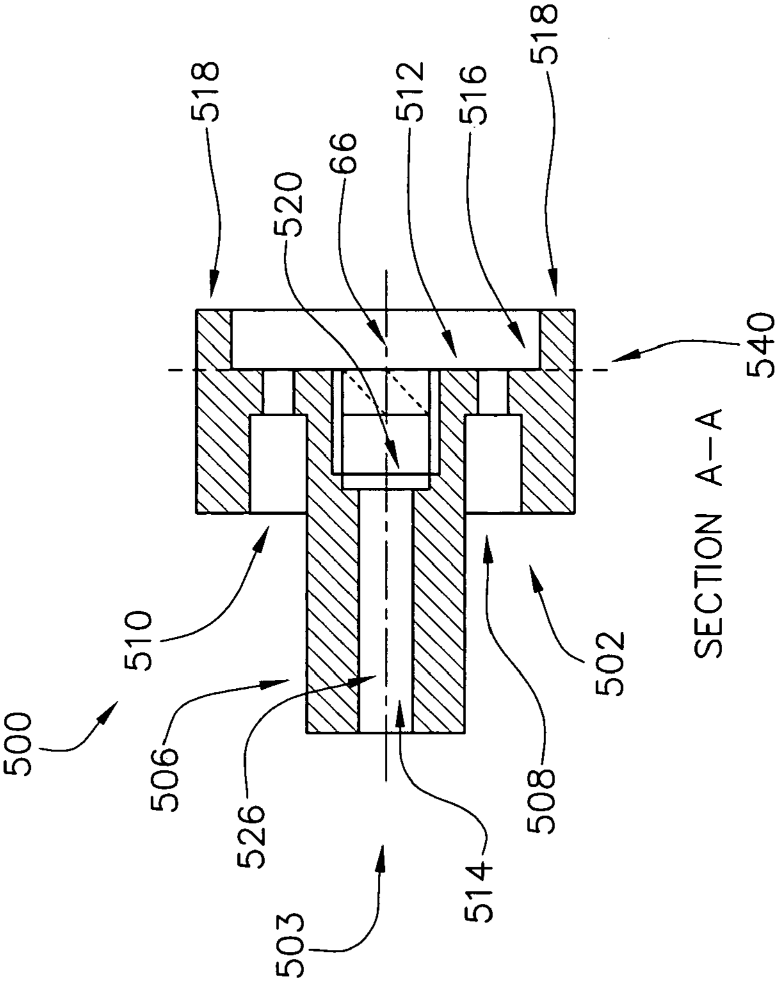
FIG. 7 is a cross-sectional view of a vortex generator taken along section A-A of FIG. 6.
Figure 12:
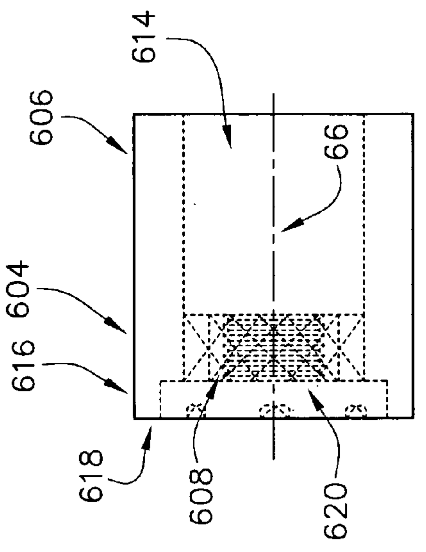
FIG. 12 is a side view of the vortex generator according to the embodiment of FIG. 8 where hidden structures are shown in dotted outline.
Figure 11:
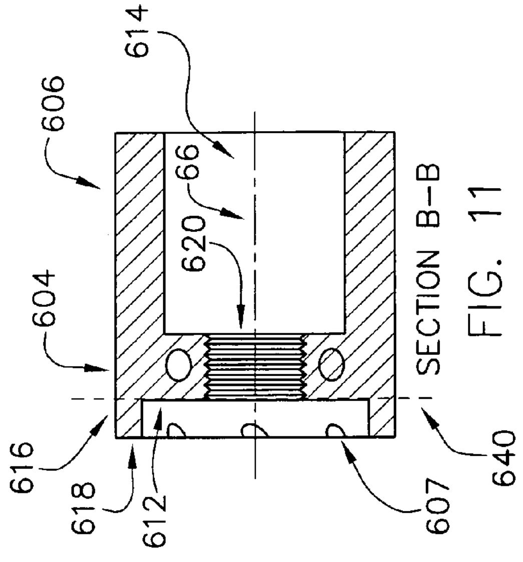
FIG. 11 is a cross-sectional side view of a vortex generator taken along section A-A of FIG. 9.
Figure 8:
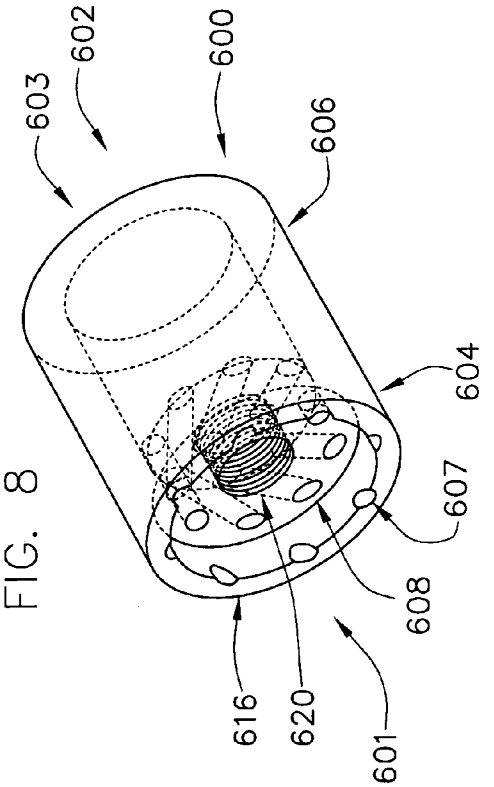
FIG. 8 is a perspective view of a vortex generator according to another embodiment.
Figure 9:
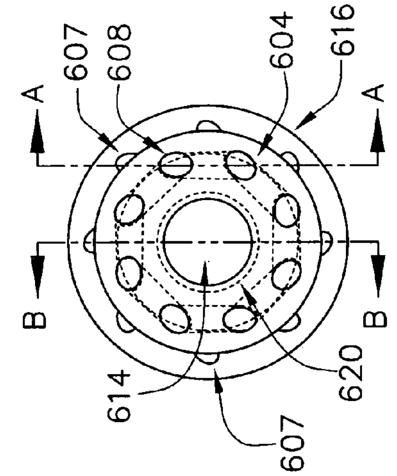
FIG. 9 is a bottom view of a vortex generator according to the embodiment of FIG. 8.
Figure 10:
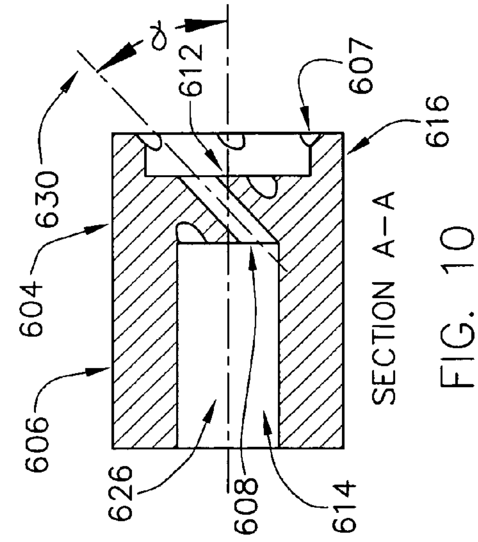
FIG. 10 is a cross-sectional side view of a vortex generator taken along section B-B of FIG. 9.

Referring to FIGS. 6 and 7, an exemplary vortex generator 500 (which can be used as vortex generator 36) is formed from a ceramic base 502. Ceramic base 502 may be cylindrical or may take some other shape. Ceramic base 502 includes a vortex body 504 and an extension 506. Base 502 also includes a lip 516 that extends on the opposite side of body 504 than extension 506. Vortex body 504 includes a multiplicity of holes 508 bored into body 504 at an angle α (see, e.g. FIG. 10). Holes 508 may be bored in from the top side 503 of body 504.

Figure 1:
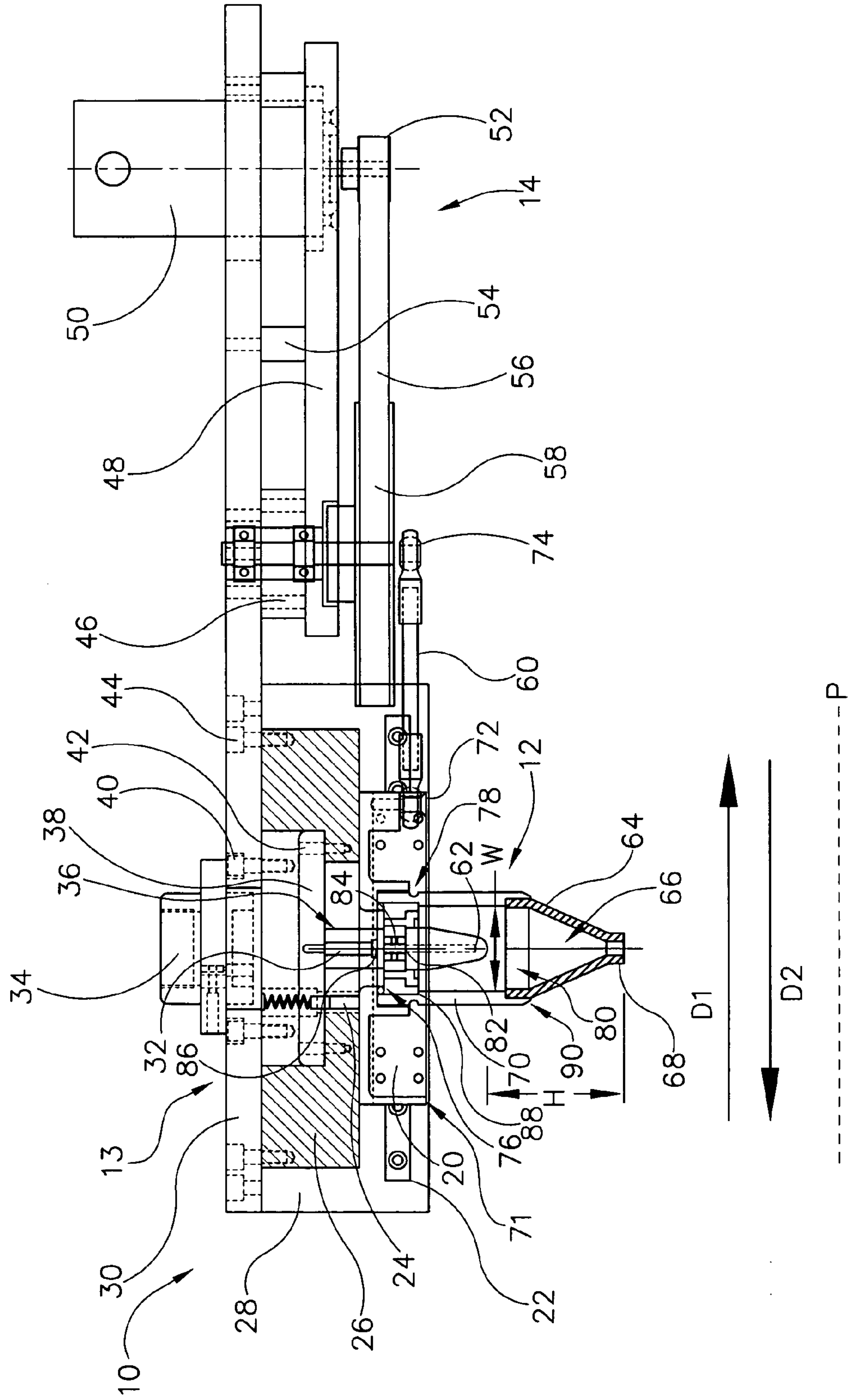
FIG. 1 is a cross-sectional view of a plasma treatment apparatus according to one embodiment.

Base 502 may also include a means to hold an electrode 62 (FIG. 1). For example, in the exemplary embodiment threads 520 are bored into body 504 and/or extension 506. These threads then line up with corresponding threads on an end of electrode 62. In other embodiments, the means used to hold the electrode can take any number of forms. For example, connecting electrode 62 to base 502 could be accomplished using mating portions of electrode and base material such as slots and pin type connections, electrode 62 could be molded into base 502, could have a projection having threads on base 502 and a mating hole(s) having threads in electrode 62, electrode 62 and base 502 could be connected by frictional connectors, by fasteners, or by any other means.

Connecting electrode 62 directly to base 502 (rather than indirectly through a threaded ring attached to base 502) allows stricter tolerances to be achieved for vortex generator 500. Further, it may tend to avoid the problem of prior systems where the material used to connect a metal ring to the base would become worn over time due to electrical leaks and/or discharges.

Base 502 may also includes a central passage 514. Electrical connectors can extend from electrode 62 through passage 514 to connect electrode 62 to a power supply. For example, a carbon brush assembly 32 (e.g. an assembly comprising a brush and a metal contact piece connected by a wire, the brush and the contact piece under tension of a spring) may extend from a depression in electrode 62 through passage 514. As another example, electrode 62 may include wires, rods, or another electrically conductive portion that extends through passage 514.

Referring to FIGS. 8-12 an exemplary vortex generator 600 is formed from a ceramic base 602. Base 602 may be cylindrical or may take some other shape. Base 602 includes a vortex body 604 and an extension 606. Vortex generator 600 also includes a lip 616 that extends on the opposite side of body 604 than extension 606. Vortex body 604 includes a multiplicity of holes 608 bored into body 604 at an angle α. When holes 608 are bored in from the bottom 601 of vortex generator 600, lip 616 may include markings 607 caused by the drill used to bore holes 608 at angle α from bottom 601 rather than the top 603.

Base 602 may also include a means to hold an electrode 62 (FIG. 1). For example, in the exemplary embodiment threads 620 are bored into body 604. These threads then line up with corresponding threads on an end of electrode 62. In other embodiments, the means used to hold the electrode can take any number of forms, such as those discussed above with respect to FIGS. 6 and 7.

Connecting electrode 62 directly to base 602 may have advantages similar to those discussed above for FIGS. 6 and 7 for this feature.

Base 602 may also includes a central passage 514. Passage 614 is much wider than passage 514 (FIG. 6). Passage 614 is about as wide as vortex body 604. Electrical connectors can extend from electrode 62 through passage 614 to connect electrode 62 to a power supply.

While holes 508 are outside of passage 514 in vortex generator 500 (FIG. 6), holes 608 are located within passage 614 in vortex generator 600, such that working gas will pass through passage 614 prior to passing through holes 608.

Referring to FIGS. 6-12, vortex generators 500 and 600 may be formed by any number of methods and from any number of materials. In many embodiments it may be preferable to form vortex generator 500, 600 from a non-conductive material such as a non-conductive ceramic. The non-conductive ceramic may be formed from a material such as aluminum oxide. This may be desirable to avoid spreading electrical current from electrode 62 to vortex generator 500, 600 and/or to further distance the high voltage potential from the ground potential.

In one embodiment, a ceramic material is formed (e.g. molded) in a shape of base 502, 602. Holes 508, 608 and passage 514, 614 are then formed (e.g. with a drill/bore) in base 502, 602. In other embodiments, holes 508, 608 and/or passage 514, 614 may be formed as part of the step of forming base 502, 602. Next, the means for holding the electrode (e.g. threads 520, 620) are formed in base 502, 602. Once the structures are formed in base 502, 602, the ceramic base is cured to harden vortex generator 500, 600. The hardened vortex generator 500, 600 may then be placed into a plasma generator 12.

In many embodiments (such as that illustrated in FIG. 1) working gas passes from a top side 510, 610 of generator 500, 600 through holes 508, 608 to a bottom side 512, 612 of vortex generator 500, 600. Bottom side 512, 612 may open up to a channel 80 (FIG. 1) in which plasma is generated. Placing the holes at an angle may tend to cause the working gas to flow through channel 80 in a swirling/vortex path. Thus, holes 508, 608 may be referred to as an integral part of a swirl system. In some embodiments, vortex generators 500, 600 may comprise at least 2 holes 508, 608 and/or up to 20 holes 508, 608. According to some of these embodiments, vortex generators 500, 600 comprise at least 4 or at least 6 holes and/or up to 15 holes or up to 10 holes.

While holes 508, 608 can be formed at any angle α, in some embodiments holes 508, 608 are formed at an angle α of at least about 30 degrees and/or up to about 60 degrees from a plane that extends perpendicular to a line that bisects the electrode carried by the vortex generator (see, e.g. line 66 of FIG. 1), perpendicular to an axis 526, 626 of vortex generator 500, 600, and/or parallel to a plane 540, 640 of body 504, 604 on the top side 510, 610 or bottom side 512, 612 of body 504, 604. In some embodiments, holes 508, 608 may be formed at an angle of about 45 degrees.

Vortex generators 500 and 600 may be used in any number of different types of plasma generators. For example, these vortex generators can be used in moving plasma generators such as that illustrated in FIG. 1. However, vortex generators 500 and 600 may also be included in the prior plasma generators such as stationary plasma generators. In some embodiments having moving generators it may be preferable to use a vortex generator 500 having a small passage 514 to hold a brush and/or having a projection 506 around which other components (e.g. an O-ring) can pass.

Figure 5:
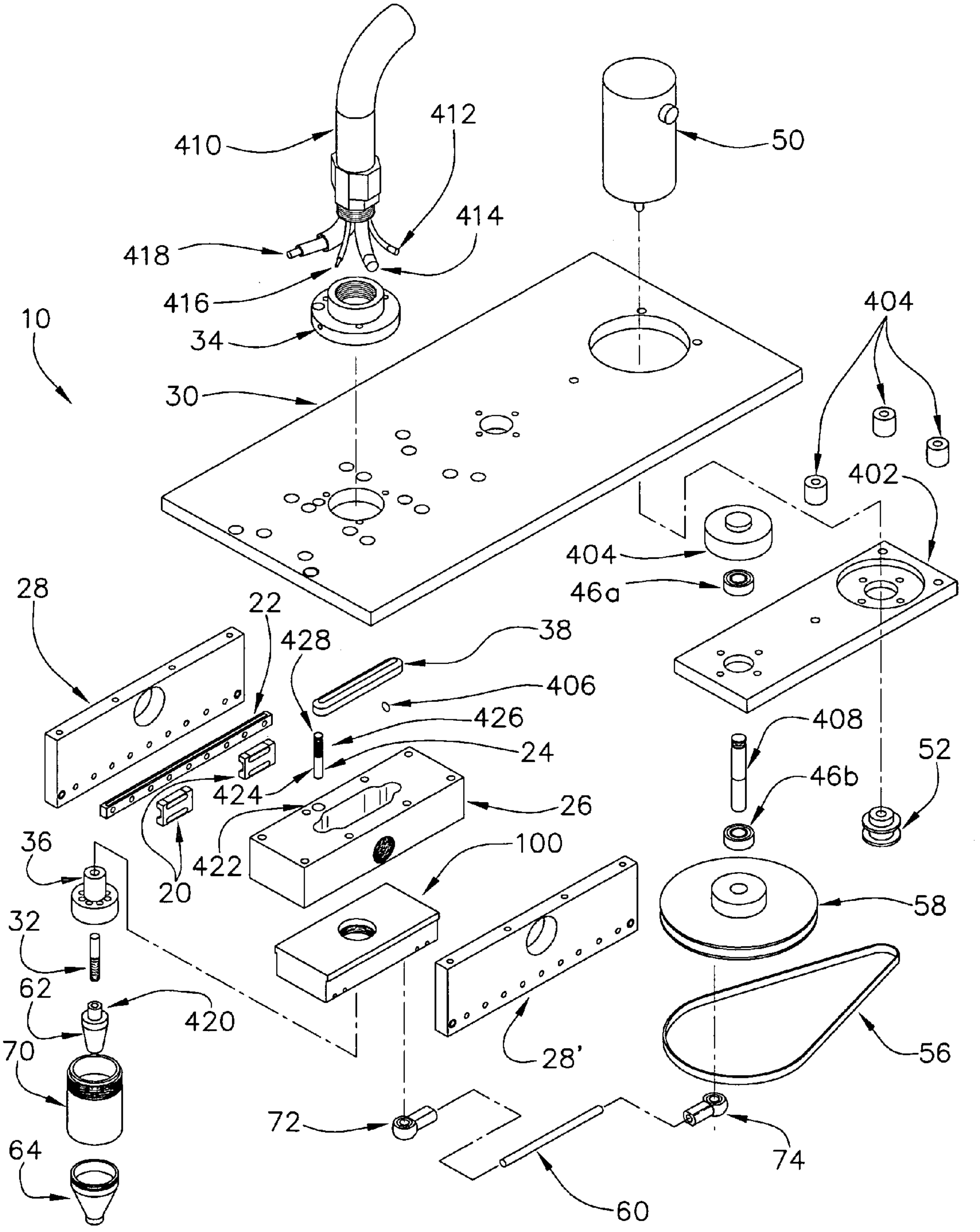
FIG. 5 is an exploded view of the plasma treatment apparatus according to the embodiment of FIG. 1.

Referring to FIGS. 1 and 5, an apparatus 10 for plasma treating a surface includes a plasma generator 12 and an actuator 14. Plasma generator 12 is configured to generate a plasma output, such as a plasma stream. Actuator 14 is configured to move plasma generator 12. Actuator 14 could be configured to continuously move plasma generator 12 or may be configured to intermittently move plasma generator 12, which could allow plasma generator 12 to treat a larger width of a surface to be treated than the width of a plasma stream generated by plasma generator 12.

In many embodiments, this movement may comprise a back and forth movement along a path P. For example, plasma generator 12 may be constrained to travel along a path P (e.g. a straight path P). Actuator 14 may be configured to continuously move plasma generator 12 back and forth along path P in a reciprocating motion. In this example, actuator 14 may be configured to move plasma generator 12 along path P in a first direction D1 and then back along path P in the opposite direction D2. While a straight path is illustrated, other paths are possible. For example, path P could be a curved path, an ovular path, a path not having a defined shape, etc. In some embodiments, actuator 14 is used to move plasma generator 12 back and forth along path P by initiating movement in one direction and then allowing some other force (e.g. gravity) to move plasma generator 12 in the other direction.

Path P may be defined by a track 22, and actuator 14 may be configured to move plasma generator 12 along track 22. Track 22 is illustrated as a linear track. However, track 22 need not be linear. In some embodiments track 22 may be a curved track, may define a path P that does not conform to a standard shape, etc. Track 22 may include a linear bearing to allow plasma generator 12 to travel smoothly across track 22. Track 22 is coupled to track plate 28 which extends along one side of a stationary portion 13 of apparatus 10.

Plasma generator 12 includes a member 20 configured to cooperate with track 22 such that plasma generator 12 is at least partially constrained by track 22. In some embodiments, this may comprise a bearing cartridge that projects around raised track 22.

A corresponding track 22' (FIG. 2) and track cooperating member 20' (FIG. 2) are located on the opposite side of plasma generator 12, parallel to track 22 and track cooperating member 20. Plasma generator 12 is held between track 22 and track 22' by track cooperating member 20 and track cooperating member 20'.

While track 22 is shown as a raised track surrounded by bearing cartridge 20 such that bearing cartridge 20 slides along track 22, track 22 and track cooperating member 20 may take any number of other forms. For instance, track 22 may be formed as a groove or slot and track cooperating member 20 may be formed as a projection that mates with the slot or groove. Further, while track 22 is shown as a singular member, track 22 could be formed from a plurality of pieces. Further, track 22 could be have a complicated shape or pattern.

In other embodiments, track 22 and cooperating member 20 might be excluded. For example, plasma generator 12 may be rigidly coupled to a device that is configured to move in a defined path without using a track.

Plasma generator 12 may include an electrode 62 (such as a copper electrode or other metallic electrode) configured to strike and/or maintain an electrical arc. Electrode 62 may be coupled to a high voltage source. In one embodiment, electrode 62 is coupled to brush 32 (such as a carbon brush). Brush 32 may be connected to wire 86 which may be connected to a contact surface 82. Surface 82 may extend through a bore in electrode 62 and make contact with electrode 62. A tension member 84 such as a spring 82 may extend from surface 82 and/or electrode 62 to brush 32 to apply force to brush 32.

The force applied to brush 32 helps maintain contact between brush 32 and a contact bar 38, which is mounted to main block 26 in a stationary portion 13 of apparatus 10 via connector 42. For example, the force may be configured to push brush 32 against contact bar 38.

Contact bar 38 is connected to a (high) voltage source such as a high voltage cable extending through end cap 34. As plasma generator 12 moves along a path, brush 32 is configured to maintain contact with contact bar 38 such that electrode 62 may continuously or intermittently be provided with electrical current. Contact bar 38 may be formed from a piece of stainless steel or other at least partially conductive material.

Body 70 and nozzle 64 of plasma generator 12 are connected to ground and can be used as a counter electrode to electrode 62. In particular, brush 24 (which may be constructed similarly to brush 32) is connected to main plate 30 (which may comprise an aluminum sheet) which is connected to ground. Force is applied to brush 24 by a tension member to maintain contact between brush 24 and conductive body 71. Body 71 holds conductive body 70 using notches 78. A conductive nozzle 64 is then screwed into body 70. While shown as multiple pieces, body 70, body 71, and nozzle 64 could be a unitary piece or some other combination of pieces. Further, these pieces may be connected in any number of manners. Further, insulation may be included on the interior and/or exterior surfaces of the counter electrode system (64, 70, 71) of plasma generator 12. In operation, brush 24 sweeps against body 71 maintaining a connection to ground as plasma generator 12 moves through its path.

Plasma is generated by plasma generator 12 when a working gas passes around an arc that is created between electrode 62 and a counter electrode such as nozzle 64 and/or body 70.

In some embodiments (e.g. ones where no insulation is used) an arc might be struck between electrode 62 and body 70. The arc may then travel down body 70 to nozzle 64, possibly ending near mouth 68.

The working gas (e.g. air) may be introduced through end cap 34 in stationary body 13. The working gas then passes through spaces 102,104 (FIG. 2) around contact bar 38 before reaching vortex generator 36, described in more detail with respect to FIGS. 5-6, below. The system may be configured such that the working gas passes through vortex generator 36 which is configured to cause the gas to take a non-straight path (e.g. a path that swirls through channel 80). The working gas then passes around electrode 62 in channel 80. The combination of the electric arc generated by electrode 62 and the working gas tend to create plasma. The plasma that is generated flows through an output port defined by mouth 68 of nozzle 64. The stream of plasma that flows through mouth 68 can be used to treat a surface of a material or object that is placed near mouth 68.

In many embodiments, plasma generator 12 is assembled by screwing nozzle 64 into threads 90 of body 70. Likewise, electrode 62 is screwed into threads of vortex generator 36. Vortex generator 36 (including electrode 62) is then placed into body 70, resting on shoulder 88 of body 70. A compressible material 76 (e.g. on O-ring) is placed over and around vortex generator 36 and/or electrode 62. Compressible material 76 maintains pressure against vortex generator 36 and holds vortex generator 36 in place against shoulder 88. Compressible material 76 may also be configured to make up for variations in manufacturing of the components of plasma generator 12.

Referring to actuator 14, any number of types of actuators may be used for actuator 14. For example, actuator 14 may be based on a mechanical system, a system of magnets (e.g. electromagnets), a hydraulic-based system, may utilize compressed air, may utilize a motor and pulleys, may use a solenoid, etc. Actuator 14 may be an electric actuator (i.e. powered by electricity).

In the illustrated example, actuator 14 is an electrical actuator including mechanical portions. Actuator 14 includes a motor 50 (e.g. an electric motor which may be a DC motor and may be a 24V DC motor). Motor 50 is mounted to plate 48 and is configured to rotate wheel/pulley 52. Pulley 52 turns belt 56 which turns timing wheel/pulley 58. Timing pulley 58 is connected to arm 60 at the pulley end 74 of arm 60 such that rotation of timing pulley 58 does not directly affect the rotational position of arm 60. Arm 60 is connected to plasma generator 12 at a generator end 72 of arm 60. As wheel 58 rotates, arm 60 moves towards and away from stationary portion 13. This causes plasma generator 12 to move back and forth along track 22 following path P in direction D1 (as end 74 is pulled away from stationary portion 13) and then following path P in direction D2 (as end 74 is pushed towards stationary portion 13). Actuator 14 may contain other components to help ensure smooth operation, such as bearings 46 around a shaft of pulley 58, a spacer 54 (e.g. aluminum spacer), etc.

Referring back to plasma generator 12, in the illustrated embodiment, mouth 68 is arranged such that a line 66 that bisects electrode 62 also bisects mouth 68. Further, the path defined by mouth 68 is parallel to line 66. Other variations are possible. Mouth 68 may be offset from line 66. For instance, mouth 68 may be placed over to the side of nozzle 64 and/or electrode 62 may be tilted. Further, mouth 68 may be at an angle with respect to line 66. Mouth 68 may be at an acute angle with respect to line 66, may be perpendicular to line 66, etc.

The distance H between the end of the electrode 62 and the bottom of plasma generator 12 may be set as needed. In some embodiments, distance H may be at least about 20 mm or at least about 30 mm. In some of these embodiments, distance H may be at least about 40 mm. In some embodiments, distance H may be up to about 100 mm or up to about 80 mm. In some of these embodiments, distance H may be up to about 70 mm or up to about 60 mm.

The width W of channel 80 defined by body 70 may also be set as needed. In some embodiments, width W is at least about 10 mm or at least about 20 mm. According to some of these embodiments, width W is at least about 25 or at least about 30 mm. According to some embodiments, width W is up to about 60 mm or up to about 50 mm. According to some of these embodiments, width W is up to about 40 mm or up to about 35 mm.

The ratio between distance H and width W may also be varied. In some embodiments, the distance H is no more than 2 times width W. In some of these embodiments, distance H is no more than 1.9 or no more than 1.7 times width W. In some embodiments, distance H is at least as large as width W. In some of these embodiments, distance H is at least 1.1 or at least 1.3 times as large as width W. According to some embodiments, distance H is about 1.5 times the size of width W.

Figure 2:
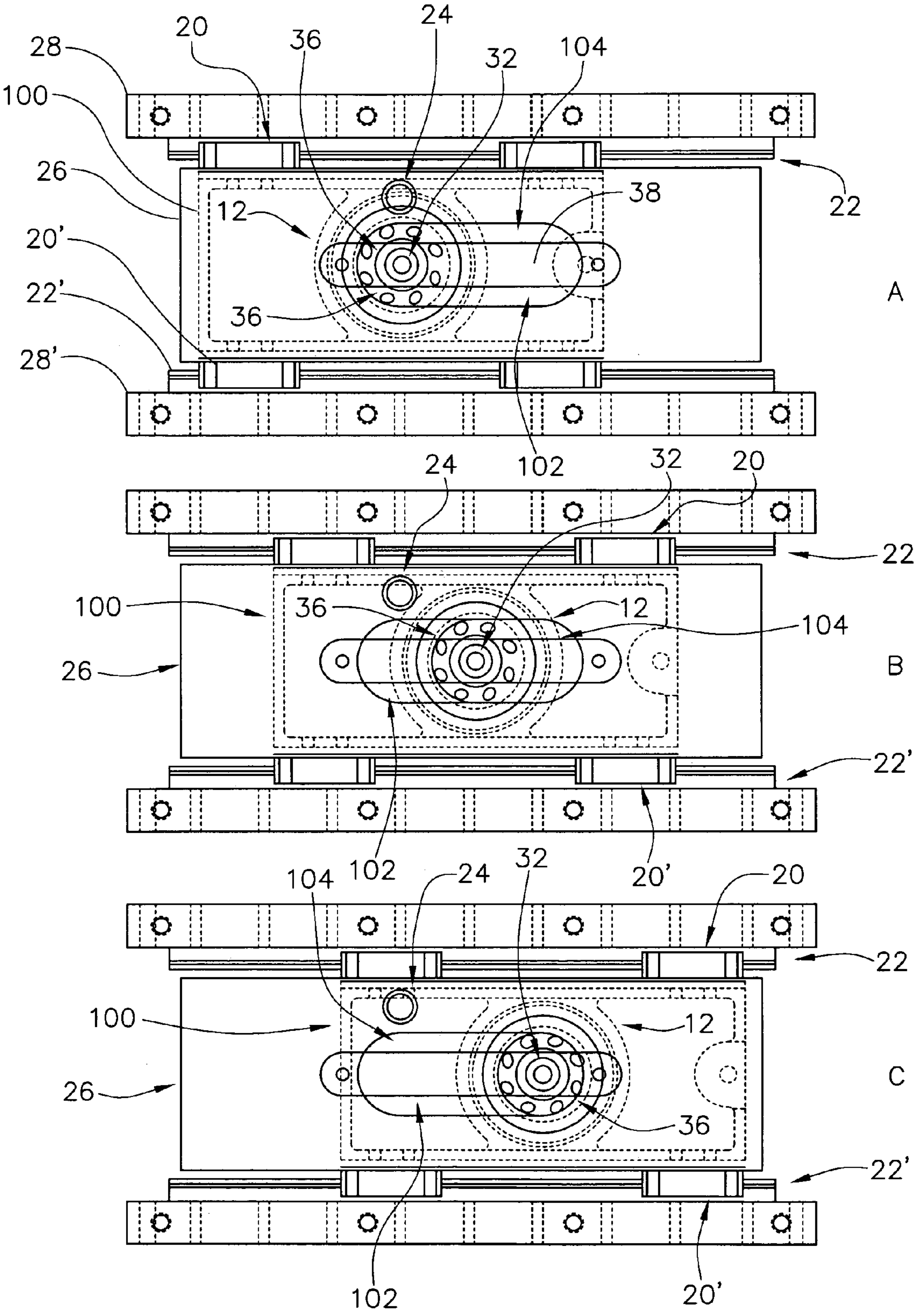
FIG. 2 is a top view of three positions of the plasma treatment portion of the plasma treatment apparatus according to the embodiment of FIG. 1.

Referring to FIG. 2, a plasma generator 12 may be moved from a first extended position A to a second extended position C, passing through intermediate position B. Plasma generator 12 may then be moved back towards extended position A through intermediate position B.

As plasma generator 12 moves through positions A, B, C a relative position between main block 26 (of portion 13) and plasma generator carriage 100 changes. As discussed above, brush 24 (carrying ground potential), tracks 22, 22' (in the exemplary dual track system), track plates 28, 28', contact bar 38, and end cap 34 (FIG. 1) are connected to main block 26. Thus, a relative position between these components and the components carried by plasma generator carriage 100 also change. Components of plasma generator carriage 100 which have their relative position changed with respect to these components can include vortex generator 36 including electrode 62 (FIG. 1), brush 32 (configured to provide high voltage), body 70 (FIG. 1), nozzle 64 (FIG. 1), and track cooperating members 20, 20' (e.g. bearings).

As can be seen in FIG. 2, a position of brush 32 with respect to contact bar 38 changes as plasma generator 12 is moved along track 22. Brush 32 is configured to brush against and maintain contact with contact bar 38 such that current can be transferred through bar 38 to electrode 62 (FIG. 1).

Figure 3:
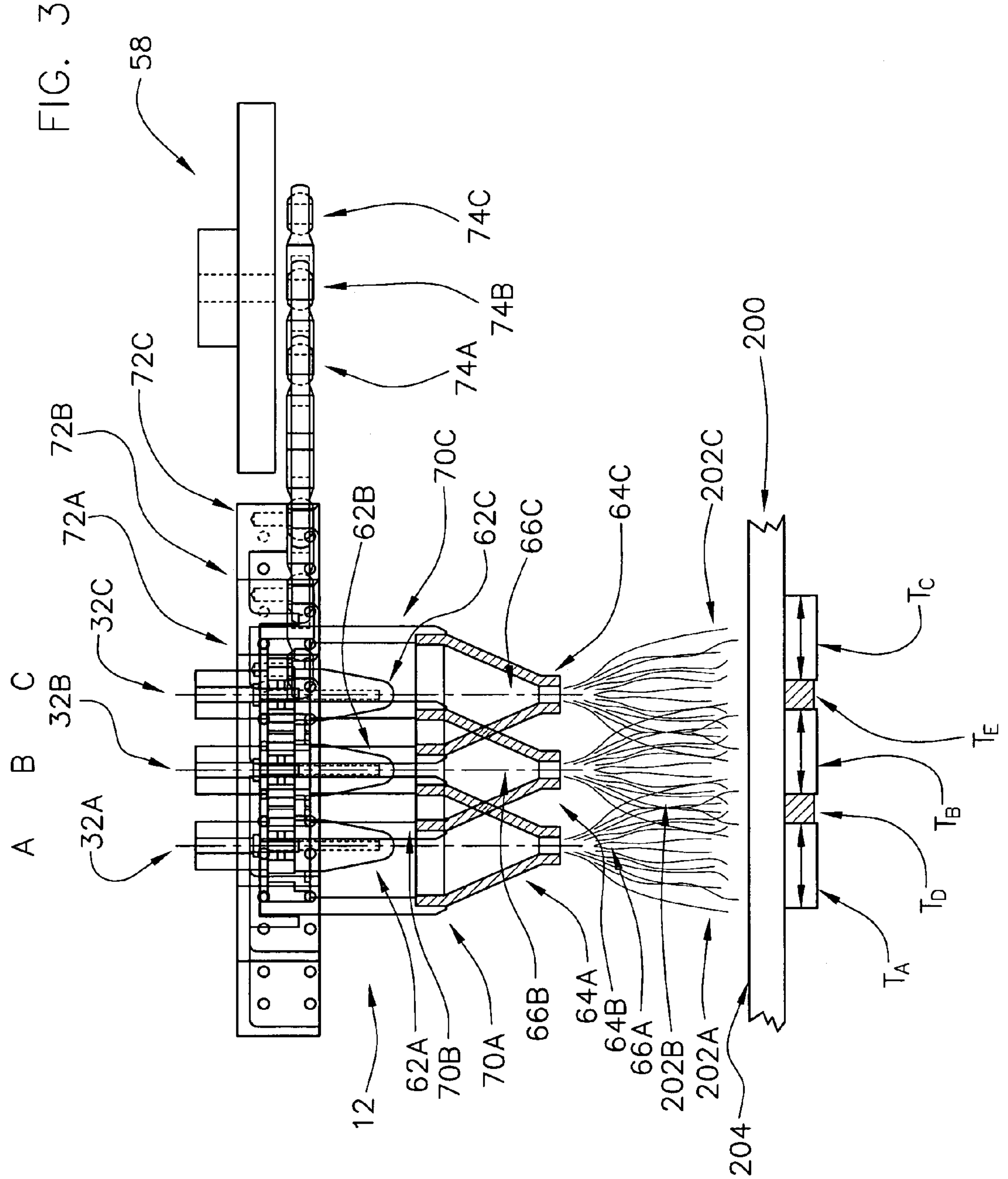
FIG. 3 is a cross-sectional view of three positions of the plasma treatment apparatus according to the embodiment of FIG. 2.

FIG. 3 is a single cross-sectional view of plasma generator 12 in three different positions—positions A, B, and C. The changes in positions of the various components of plasma generator 12 between positions A, B, and C can be seen by noting the positions of the same numbered component followed by the position letter. For example, 62A points to the position of electrode 62 in position A, 62B points to the position of electrode 62 in position B, and 62C points to the position of electrode 62 in position C.

Referring to FIG. 3, plasma generator 12 may be used to treat a surface 204 of an object 200. Plasma generator 12 may be used to generate a stream of plasma 202. Each stream of plasma 202 treats a portion T of surface 204. Plasma generator 12 may be configured such that plasma stream 202 is output generally parallel to line 66. In each position, plasma stream 202 can only treat a limited area of surface 204. However, plasma generator 12 can be moved to provide treatment to a larger area of surface 204. Thus, plasma stream 202A will treat portion $T_A$, plasma stream 202B will treat portion $T_B$, and plasma stream 202C will treat portion $T_C$. The combination of portions $T_A$, $T_B$, and $T_C$ combine to treat an area of surface 204 greater than the area treated by a single plasma stream 202. Plasma generator 12 may be configured to generate plasma streams 202 in additional positions such that surface 204 is also treated at portions $T_D$ and $T_E$. In this manner, an entirety of surface 204 between two points (defined by the end positions of $T_A$ and $T_C$) can be treated by plasma generator 12. In many embodiments, plasma generator 12 will travel continuously through a multiplicity of positions between left position A and right position C such that plasma stream 202 is continuously provided to surface 204 between portion $T_A$ and portion $T_C$. In addition to movement in directions D1 and D2 (FIG. 1), a relative position between object 200 and plasma generator 12 can be changed in other directions as well to treat a larger amount of surface 204. For example, object 200 may be carried on a conveyor (not illustrated) past plasma generator 12. As another example, plasma generator may be moved in a third direction (not illustrated) perpendicular to direction D1, such as by means of a robotic arm or along a second track, possibly using a second actuator. Any number of alternate arrangements can be used as well.

In some embodiments, the width of an individual area of a portion T treatable by a plasma generator may be at least about 0.1 inches and/or up to about 2 inches when surface 204 is 1 inch away from mouth 68 (FIG. 1). According to some of these embodiments, the width of an individual area is at least about 0.2 inches or 0.3 inches and/or up to about 1 inch or 0.6 inches.

Figure 4:
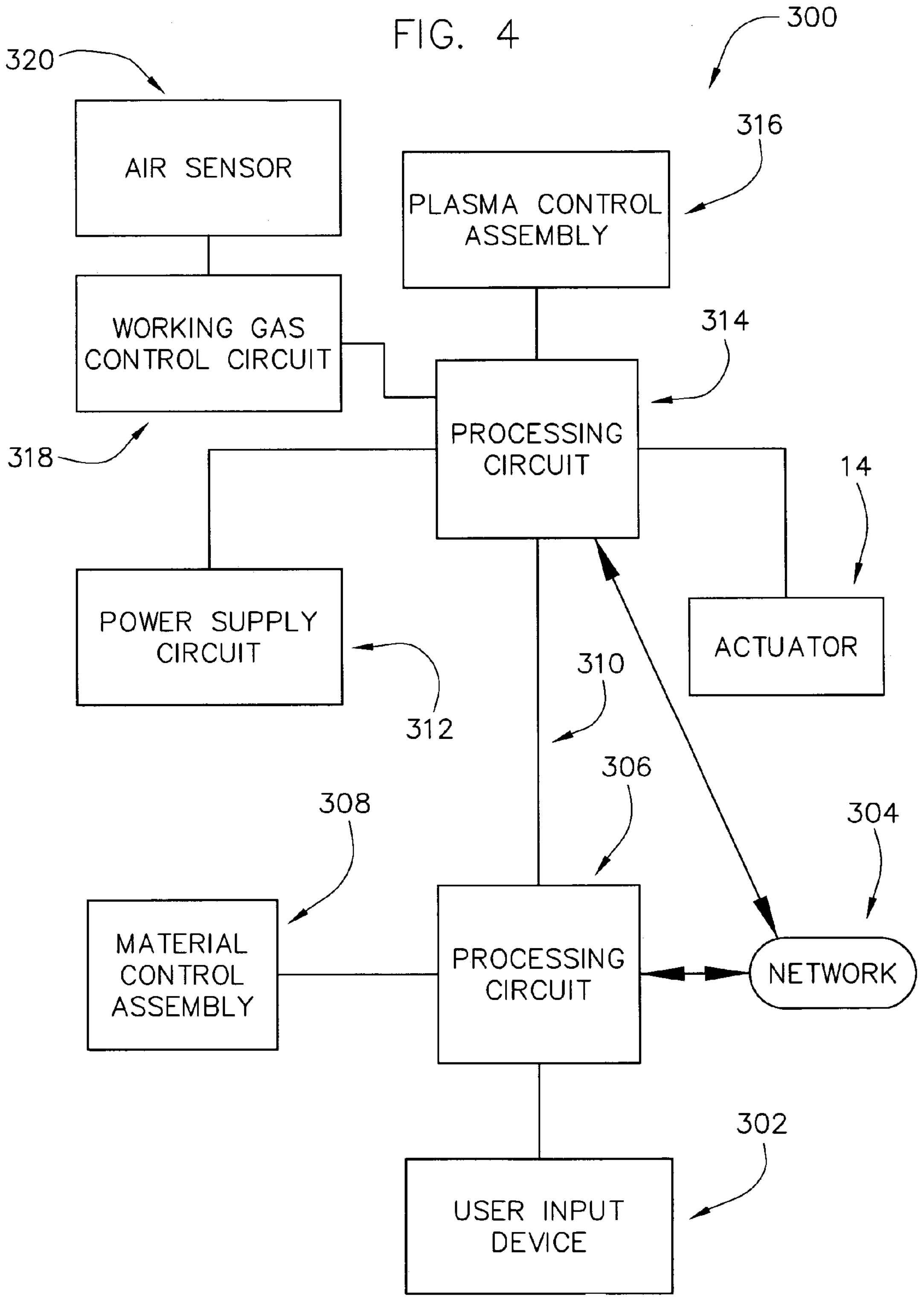
FIG. 4 is a control diagram of a surface treatment system usable with the embodiment of FIG. 1.

Referring to FIG. 4, a system for plasma treating an object includes a processing circuit 314. Processing circuit 314 can be configured to control actuator 14, which in turn controls movement of plasma generator 12 (FIG. 1). Processing circuit 314 may be configured to control whether actuator 14 operates, a direction in which actuator 14 moves plasma generator 12, or any other function of actuator 14.

Processing circuit 314 can also be configured to control power supply circuit 312 which provides high voltage power to plasma generator 12. By controlling power supply circuit 312, processing circuit 314 can be configured to control the generation of a plasma stream 202 (FIG. 3) from plasma generator 12.

Processing circuit 314 may also be configured to control a working gas control circuit 318. Working gas control circuit controls the influx of a working gas to plasma generator 12. Working gas control circuit. 318 may be configured to control an air compressor such that compressed air flows into plasma-generator 12. Working gas control circuit and/or processing circuit 314 may operate in response to an air flow sensor which monitors parameters relating to the working gas, such as a quality/purity of the working gas.

Processing circuit 314 may also be configured to control a plasma generator control assembly 316, such as a robotic arm on which the plasma generator is located, which is configured to control a position of plasma generator 12 an/or apparatus 10.

Processing circuit 314 may include working gas control circuit 318, power supply circuit 312, plasma control assembly 316, and actuator 14, may share circuit components with these circuits, or may be separate from these components. Processing circuit 314 can include various types of processing circuitry, digital and/or analog, and may include a microprocessor, microcontroller, application-specific integrated circuit (ASIC), or other circuitry configured to perform various input/output, control, analysis, and other functions to be described herein. Processing circuit 314 may be configured to digitize data, to filter data, to analyze data, to combine data, to output command signals, and/or to process data in some other manner. Processing circuit 314 may also include a memory that stores data. Processing circuit 314 could be composed of a plurality of separate circuits and discrete circuit elements. In some embodiments, processing circuit 314 will essentially comprise solid state electronic components such as a microprocessor/microcontroller.

Processing circuit 314 may also be coupled to processing circuit 306. Processing circuits 314 and 306 may be a common circuit, or may be composed of separate circuits. If separate circuits, processing circuits 314 and 306 may be directly connected by a communication line 310, may be indirectly coupled by way of a network 304 or a separate control circuit.

Processing circuit 306 may be configured to receive user inputs from a user input device 302. Processing circuit 306 may also be configured to control a material control assembly 308. Material control assembly 308 is configured to control a position of an object by moving the object. For example, material control assembly 308 may comprise one or more conveyors configured to convey objects in a direction transverse to a direction that plasma generator 12 is moved by actuator 14. Material control assembly 308 could also include a robotic arm configured to move the object. Material control assembly 308 could be configured to move the object in a plurality of directions with respect to plasma generator 12.

Processing circuits 306, 314 may be configured to control an assembly-line based on data received about the plasma treatment of an object. For example, processing circuits 306, 314 may be configured to stop a conveyor assembly 308 if treatment is compromised.

Referring back to FIG. 5, a system may be constructed according to the embodiment of FIG. 1 as shown in the exploded view of FIG. 5. Contact bar 38 may be connected to main block 26 by a set screw 406. Brush assembly 24 may extend through space 422 in main block 26. Brush assembly 24 may include a carbon brush 424 that is connected to a contact 428 by a wire (not illustrated). A tension member 426 such as a spring may extend between brush 424 and contact 428.

Contact 428 is connected to ground wire 416 while contact bar 38 is connected to high voltage wire 418. Ground wire 416 and high voltage wire 418 are carried by a common high voltage cable assembly 410. Cable assembly 410 may also include gas supply tube 414 (e.g. an air supply tube) and/or a portion 412 of a pressure sensor, such as a differential pressure tube.

Motor 50 is connected to motor plate 402. Wheel 58 is also connected to motor plate 402. Wheel 58 is connected to shaft 408 around which bearings 46*a*, 46*b* are mounted. Spacers 404 help maintain space between motor plate 402 and main plate 30.

EXEMPLARY EMBODIMENTS

One embodiment is directed to a device for plasma treating a surface. The device includes a plasma generator configured to provide a plasma treatment to a surface, and an actuator configured to provide a reciprocating motion to the plasma generator.

Another embodiment is directed to a device for plasma treating a surface. The device includes a plasma generator configured to provide a plasma treatment to a surface, the plasma generator configured to generate a plasma stream capable of treating an area of the surface of a first size. The device also includes a track, and an actuator configured to move the plasma generator along the track such that the plasma generator is configured to treat an area of the surface that is larger in size than the first size. The track may be a linear track.

Another embodiment is directed to a device for plasma treating a surface. The device comprises a plasma generator configured to provide a plasma treatment to a surface and an actuator configured to move the plasma generator in a first direction along a path and in a second direction substantially along the path. The second direction is different than the first direction.

Another embodiment is directed to a device for plasma treating a surface. The device includes a plasma generator configured to provide a plasma treatment to a surface, and an actuator configured to provide a reciprocating motion to the plasma generator.

Another embodiment is directed to a device for plasma treating a surface. The device includes a plasma generator configured to provide a plasma treatment to a surface, and an electrical actuator configured to move the plasma generator back and forth along a substantially linear path.

Another embodiment is directed to a device for plasma treating a surface the device includes a plasma generator configured to provide a plasma treatment to a surface. The plasma generator comprises a mouth through which plasma is provided from the plasma generator. The mouth is offset from the center of the plasma generator. The device may also include an actuator configured to move (e.g. rotate) the mouth.

Another embodiment provides a plasma generator and a means for treating an area of a surface that is larger in size than a size of a plasma output of the plasma generator.

Another embodiment is directed to a device for plasma treating a surface. The device includes a plasma generator configured to provide a plasma treatment to a surface, and an electrical actuator configured to move the plasma generator from a first position to a second position via an intermediate position. The actuator is then configured to move the actuator back to the first position via the intermediate position.

Another embodiment is directed to a device for plasma treating a surface. The device includes a plasma generator configured to provide a plasma treatment to a surface, and an electrical actuator configured to move the surface to be treated in a plurality of directions with respect to the plasma generator.

In the devices according to any of the embodiments discussed above, the plasma generator may include one or more of an electrode configured to provide an electrical arc, a counter electrode for providing the electrical arc, an input for a working gas configured to receive a working gas such that the electrical arc and the working gas interact to form plasma; a nozzle configured to output a plasma stream, and a mouth through which plasma can exit. The plasma generator may be configured to continuously provide a plasma output as it is moved by the actuator.

The vortex generator may comprise a unitary piece having angled holes configured such that a working gas will travel through the holes, and threads for holding an electrode. The vortex generator may be formed of a non-conductive material such as ceramic. The vortex generator may be configured such that a brush assembly can extend from an electrode (potentially held by the vortex generator) through the vortex generator.

The brush assembly may be configured such that the electrode is provided with electrical current while the plasma generator is moved in the manner discussed in the embodiments above.

The electrode may be enclosed in a chamber and the walls of the chamber may serve as the counter electrode. The chamber may be defined by a body and by a nozzle separate from the body.

In the devices according to any of the embodiments discussed above, the actuator may include a motor configured to move the plasma generator as discussed in any of the embodiments. The motor may be configured to drive a wheel. The wheel may be linked to the plasma generator by an arm. The actuator may be configured to move all of the plasma generator or only a portion of the plasma generator. The actuator may be configured to move the plasma generator back and forth in the manner described in the embodiment.

The device according to any of the embodiments discussed above may include a plurality of plasma generators configured to provide a plasma treatment to the surface. The plurality of plasma generators may be linked or may be separate. The plasma generators may be arranged in a line, may be staggered, may form a regular, repeating pattern, or may take some other configuration that is not any of these configurations.

The devices discussed with respect to any of the embodiments above may include a first portion configured to receive a power supply, and a second portion comprising an electrode and a plasma output. The actuator may be configured to move the second portion as discussed in the embodiment. Movement in the manner discussed in the embodiment may cause the first portion and the second portion to change their relative positions. A track may be connected to the first portion. The first portion may be configured to be a stationary portion.

The plasma generators discussed above may include all-metal treating heads.

A system for treating a surface may include a device constructed according to one or more of the embodiments discussed above. The system may include a cabinet. The cabinet may be one or more of welded and powder-coated. The cabinet may contain a generator, a control system, a high-voltage transformer, the device constructed according to one of the above-mentioned embodiments, and/or an air-supply system that provides a gas to the plasma generator.

Another embodiment is directed to a method for treating vehicle parts. The method includes providing a part of a vehicle, applying plasma to a surface of the vehicle part, and installing the car part in a vehicle. Applying plasma may comprise applying plasma using a movable plasma generator. The movable plasma generator may be constructed according to one or more of the embodiments discussed above. The vehicle part may include an interior panel and/or a headlight shielding. The vehicle part may be a plastic part.

Another embodiment is directed to a method of cleaning a cell phone component. The method includes providing a component of a cell phone, and applying plasma to a surface of the component. The component may then be used to form a cell phone. Applying plasma may comprise applying the plasma using a high pressure working gas. This may allow particles that have been de-charged by the plasma stream to be blown away by the high pressure of the plasma stream.

Another embodiment is directed to a method of treating an area of a surface that is greater than an area of a plasma stream. The method includes generating a plasma output, applying the plasma output to the surface to be treated. Applying the plasma output includes reciprocating the plasma output. The output may be reciprocated along a path, which may be a linear path. Reciprocating the plasma output may comprise reciprocating a plasma generator, which may include reciprocating a portion of the plasma generator (e.g. the nozzle) or may include reciprocating the entire plasma generator. The plasma generator (and corresponding device) may be constructed according to any of the embodiments discussed above. The plasma generator is preferably reciprocated while the plasma generator is providing a plasma output. The plasma output is preferably continuous throughout the path of reciprocation.

Another embodiment is directed to a method for plasma treating a surface that is larger than a width of a plasma beam. The method includes generating a plasma output from a plasma generator and applying the plasma output to the surface to be treated. Applying the plasma output includes moving the plasma generator along a track. The track may be a linear track. Moving the plasma generator along the track may include moving a portion of the plasma generator (e.g. the nozzle) along the track or may include moving the entire plasma generator along the track. The plasma generator (and corresponding device) may be constructed according to any of the embodiments discussed above. The plasma generator is preferably moved along the track while the plasma generator is providing a plasma output. The plasma output is preferably continuous throughout the path of travel along the track. The plasma generator may be directly connected to the track along which it is moved, or may be connected to another body, which other body is moved along the track.

Another embodiment is directed to a method for plasma treating a surface that is larger than a width of a plasma beam. The method includes generating a plasma output, applying the plasma output to a surface to be treated by moving the plasma output in a first direction along a path, and applying the plasma output to a surface to be treated by moving the plasma output in a second direction different than the first direction, movement in the second direction substantially being movement along the same path as movement in the first direction.

The path may be a linear path. Moving the plasma generator along the path may include moving a portion of the plasma generator (e.g. the nozzle) along the path or may include moving the entire plasma generator along the path. The plasma generator (and corresponding device) may be constructed according to any of the embodiments discussed above. The plasma generator is preferably moved along the path while the plasma generator is providing a plasma output. The plasma output is preferably continuous throughout the course of travel along the path.

According to any of the above-mentioned methods, the movement may be accomplished using an actuator (e.g. an electric actuator) as discussed above. Movement may be back and forth. Movement may be continuous. Movement may be controlled by a processing circuit, and/or timed with movement of and/or presence of an object to be treated—which information may be supplied to the processing circuit (e.g. from a sensor or from another circuit which may be monitored by the processing circuit). The methods may include stopping movement of the plasma output based on the occurrence of an event.

Another embodiment is directed to a vortex generator for generating a vortex in and holding an electrode of a plasma generator. The vortex generator includes a base material. The vortex generator is configured to generate a vortex of working gas in the plasma generator. The base material is configured to directly hold the electrode.

Another embodiment is directed to a vortex generator for generating a vortex in and holding an electrode of a plasma generator. The vortex generator includes a base material that defines an attachment surface. The attachment surface is configured to attach to a surface of the electrode. The vortex generator is configured to generate a vortex of working gas in the plasma generator. The base material may be configured such that the electrode is releasably attached or may be configured such that the electrode is fixedly attached.

Another embodiment is directed to a vortex generator for generating a vortex in and holding an electrode of a plasma generator. The vortex generator comprises a non-conductive base material. Threads are integrally formed in the base material. A plurality of holes are also formed in the base material. The plurality of holes are configured to receive a working gas and to generate a vortex of working gas in the plasma generator. A second hole is also formed in the base material. The second hole can receive a conductor which may attach to the electrode to supply power to the electrode.

Another embodiment is directed to a vortex generator for generating a vortex in and holding an electrode of a plasma generator. The vortex generator comprises a base material defining threads. The vortex generator is configured to generate a vortex of working gas in the plasma generator using the base material.

Another embodiment is directed to a vortex generator for generating a vortex in and holding an electrode of a plasma generator. The vortex generator comprises threads integrally formed in a base material. The vortex generator is configured to generate a vortex of working gas in the plasma generator.

Another embodiment is directed to a plasma generator. The plasma generator comprises a working gas inlet for receiving a working gas, a chamber in which plasma is generated, an electrode configured to generate an electrical arc, and a vortex generator arranged such that at least some of the working gas passes from the working gas inlet through the vortex generator before passing through the chamber. The vortex generator includes a base material having a plurality of holes through which working gas can pass, the holes being arranged to generate a vortex in the chamber. The base material is configured to hold the electrode.

Another embodiment provides a plasma generator. The plasma generator comprises a means for generating an electrical arc, an inlet for a gas, and a means for generating a vortex of the gas and for holding an electrode in a one-piece frame. The generator is configured such that the gas and the electrical arc interact to form plasma.

Another embodiment is directed to a plasma generator. The plasma generator comprises a gas inlet for receiving a gas, an electrode configured to generate an electrical arc, a chamber in which plasma is generated from the interaction of the gas and the electrical arc; and a vortex generator arranged such that at least some of the gas passes from the gas inlet through the vortex generator before passing through the chamber. The vortex generator is configured to swirl the gas and maintain a position of the electrode using a common body.

Another embodiment is directed to a method for forming a vortex generator. The method comprises providing a body, forming a vortex system in the body, and connecting the electrode to the body. The method may also include forming a means to connect the electrode to the body in the body. The means formed in the body could include threads.

The vortex generators and plasma generators including the vortex generators may include any combination of the above described features. The vortex generators may be used in stationary plasma generators or may be used in moving plasma generators. The vortex generators can include one or more (or none) of other features such as the following. The vortex generator may include a hole in the base material configured to receive a conductor to supply power to the electrode. The hole may be configured such that the electrode can be attached on a first side of the base material and the conductor extends through a second side of the base material. The vortex generator may be configured such that a working gas passes through the hole receiving the conductor before passing through the plurality holes configured to generate the vortex in the chamber of the plasma generator. The base material of the vortex generator may include a body and/or an extension. The plurality of holes in the base material configured to receive a working gas may be formed in the body. The hole configured to receive the conductor may extend through the body and/or the extension. The base material may further include a lip. The vortex generator may be configured such that the electrode is at least partially recessed in the lip. Threads is the base material may be configured to mate with corresponding threads of the electrode. The base material may be composed essentially of non-conductive material such as a non-conductive ceramic. And any number of additional features can be included in the vortex generator, including those features discussed above (particularly with reference to FIGS. 6-12).

Any of the above-described illustrative methods, devices, and systems can be combined according to other embodiments. For example the method for treating a vehicle part may include treating the vehicle part using a reciprocating plasma generator. The reciprocating plasma generator could include a vortex generator formed as described in any of the illustrative embodiments.

In constructing the claims directed to these and other embodiments, the claims should be read in light of the following:

Reference to “a” or “at least one” in a claim reciting “comprising” as the transitional language is a reference to an embodiment that includes one or more of the component recited unless limited by other specific terms such as "a single", "a unitary", etc.

Reference to "and/or" in the claims should be given its ordinary meaning which is the use of one or more of the elements recited in the "and/or phrase." In other words, it covers the use of just one of the elements recited in the "and/or phrase", and also covers use of more than one of the elements recited in the "and/or phrase." The same meaning should be given to a claim reciting "at least one of ______, ______, and ______."

The invention has been described with reference to various specific and illustrative embodiments and techniques. However, it should be understood that many variations and modifications may be made while remaining within the spirit and scope of the invention. For example, while much of the discussion has related to loaves of bread, other dough-based baking products (particularly products which are used to define the three-dimensional shape of the product—such as cake or brownie pans) can be formed according to the disclosure of the present application.

For example, the brushes 24, 32 can be arranged in any manner on any portion of the system. Alternatively, other structures (such as permanently fixed wires which extend across a gap between moving and non-moving portions) may be used in place of brushes 24, 32.

As another example, in the illustrated embodiment, a single contact bar is configured to extend across the length of the path P (FIG. 1) of plasma generator 12. In other embodiments, more than one contact bar may be used. In most embodiments, at least one contact bar will be used. In the illustrated embodiment, brush 32 maintains electrical contact with contact bar 38 for the entire length of travel of plasma generator 12. In some embodiments, there may be gaps at the end positions, middle positions, or some combination of positions where electrical power is not provided—such as to avoid providing plasma treatment to a specific portion of the surface of the object being treated.

As another example, plasma generator 12 need not be placed on a fixed track 22 in some embodiments, may be placed on a multi-option track that allows customization, may be placed on a single part or multi-part track (e.g. a 4 or more piece track), etc.

As another example, vortex generator 36 can take a standard form according to some embodiments, the holes 408 of vortex generator 36 can receive a working gas from a common working gas supply or can receive air from multiple (including individual) working gas supplies. In some embodiments, vortex generator 36 can be excluded and replaced by components which achieve the same effect such as air pipes arranged at an angle with respect to the direction between electrode 62 and mouth 68. In still other embodiments, plasma generator 12 may not have a swirl system for the working gas such that the working gas passes through plasma generator 12 in a straight direction.

While shown as stationary, portion 13 could be configured to move with portion 100 being stationary. In other embodiments, both portions 13 and 100 could be configured to move or be movable.

While movement of plasma generator 12 is illustrated in one dimension, movement may be made in more than one dimension. Also, while linear reciprocation is the primary type of reciprocation of interest as shown in FIGS. 2 and 3, other types of reciprocation, such as angular reciprocation (i.e. reciprocating about a pivot point) are also within the scope of the claims unless stated otherwise.

Various other modifications, changes, exclusions, and inclusions can be made while staying within the scope of the claims as recited. For example, the teachings herein can be applied to other treatment systems, such as other electrostatic discharge treatment systems, flame treatment systems, etc.

What is claimed is:

1. A vortex generator for generating a vortex in and holding an electrode of a plasma generator, the vortex generator comprising:
- a non-conductive base material;
- threads formed in the base material;
- a plurality of first holes in the base material configured to receive a working gas and to generate a vortex of working gas in the plasma generator; and
- a second hole in the base material configured to receive a conductor to supply power to the electrode;
- wherein the threads are located in the second hole.

2. The vortex generator of claim 1, wherein the base material comprises a body in which the plurality of first holes are located, an extension on one side of the body, and a lip on the other side of the body.

3. The vortex generator of claim 1, wherein the second hole extends through the base material and is configured to receive a conductor to supply power to the electrode, and wherein the second hole configured such that the electrode can be attached on a first side of the base material and the conductor extends through a second side of the base material.

4. The vortex generator of claim 1, wherein the plurality of first holes are formed at an angle with respect to a plane defined by a line that bisects the electrode when the electrode is held by the base material.

5. The vortex generator of claim 1, wherein the base material comprises a body having a bottom side and the plurality of first holes are at a non-perpendicular angle with respect to a plane defined by the bottom side.

6. The vortex generator of claim 5 wherein the angle is at least about 30 degrees and up to about 60 degrees.

7. The vortex generator of claim 1 wherein the base material comprises a body comprising the plurality of first holes and an extension.

8. The vortex generator of claim 7, wherein the base material further comprises a lip on an opposite side of the body than the extension.

9. The vortex generator of claim 1, wherein the base material comprises ceramic material.

10. A vortex generator for generating a vortex in and holding an electrode of a plasma generator, the vortex generator comprising:
- a non-conductive base material;
- threads formed in the base material;
- a plurality of first holes in the base material configured to receive a working gas and to generate a vortex of working gas in the plasma generator; and
- a second hole in the base material configured to receive a conductor to supply power to the electrode;
- wherein the vortex generator is configured such that a working gas passes through the second hole before passing through the plurality of first holes.

11. The vortex generator of claim 10, wherein the base material comprises a body in which the plurality of first holes are located, an extension on one side of the body, and a lip on the other side of the body.

12. The vortex generator of claim 10, wherein the second hole extends through the base material and is configured to receive a conductor to supply power to the electrode, and wherein the second hole configured such that the electrode can be attached on a first side of the base material and the conductor extends through a second side of the base material.

13. The vortex generator of claim 10, wherein the plurality of first holes are formed at an angle with respect to a plane defined by a line that bisects the electrode when the electrode is held by the base material.

14. The vortex generator of claim 10, wherein the base material comprises a body having a bottom side and the plurality of first holes are at a non-perpendicular angle with respect to a plane defined by the bottom side.

15. The vortex generator of claim 14 wherein the angle is at least about 30 degrees and up to about 60 degrees.

16. The vortex generator of claim 10, wherein the base material comprises a body comprising the plurality of first holes and an extension.

17. The vortex generator of claim 16, wherein the base material further comprises a lip on an opposite side of the body than the extension.

18. The vortex generator of claim 10, wherein the base material comprises ceramic material.

19. A plasma generator comprising:
an inlet configured to receive a working gas;
an electrode configured to generate an arc in proximity to the working gas; and
a vortex generator for generating a vortex in and holding the electrode of the plasma generator, the vortex generator comprising,
a non-conductive base material;
threads formed in the base material;
a plurality of first holes in the base material configured to receive the working gas and to generate a vortex of working gas in the plasma generator; and
a second hole in the base material configured to receive a conductor to supply power to the electrode;
wherein the threads are located in the second hole; and
a nozzle configured to provide plasma generated by interaction of the working gas and the arc from the electrode.

20. The plasma generator of claim 19, further comprising a body coupled to the nozzle, the body configured to contain the vortex generator and the electrode, wherein at least one of the body and the nozzle operates as a counter electrode to the electrode.

* * * * *